USO10508757B2

United States Patent
Vaccaro

(10) Patent No.: US 10,508,757 B2
(45) Date of Patent: *Dec. 17, 2019

(54) HANGER FOR MOUNTING CABLES

(71) Applicant: CommScope Technologies LLC, Hickory, NC (US)

(72) Inventor: Ronald A. Vaccaro, Taylorsville, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,503

(22) Filed: Feb. 20, 2019

(65) Prior Publication Data
US 2019/0178419 A1 Jun. 13, 2019

Related U.S. Application Data

(63) Continuation of application No. 15/664,493, filed on Jul. 31, 2017, now Pat. No. 10,253,906.

(60) Provisional application No. 62/375,213, filed on Aug. 15, 2016, provisional application No. 62/444,409, filed on Jan. 10, 2017, provisional application No. 62/483,997, filed on Apr. 11, 2017.

(51) Int. Cl.
| F16L 3/22 | (2006.01) |
| F16L 3/08 | (2006.01) |
| H02G 7/10 | (2006.01) |
| F16L 3/133 | (2006.01) |
| H02G 3/32 | (2006.01) |
| F16L 3/10 | (2006.01) |
| F16B 2/04 | (2006.01) |

(52) U.S. Cl.
CPC ............. *F16L 3/133* (2013.01); *F16L 3/221* (2013.01); *H02G 3/32* (2013.01); *F16B 2/04* (2013.01); *F16L 3/10* (2013.01); *H02G 7/10* (2013.01)

(58) Field of Classification Search
CPC ..... F16L 3/12; F16L 3/13; F16L 3/221; F16L 3/222; F16B 2/22; F16B 21/075
USPC .................................... 248/68.1, 69, 71, 73
See application file for complete search history.

(56) References Cited

U.S. PATENT DOCUMENTS

| 5,368,261 | A | 11/1994 | Caveney et al. |
| 5,967,468 | A | 10/1999 | Veghte et al. |
| D461,396 | S | * 8/2002 | Ferrill ........................ D8/356 |
| 6,899,305 | B2 | 5/2005 | Korczak et al. |

(Continued)

FOREIGN PATENT DOCUMENTS

KR    20100015227    2/2010

OTHER PUBLICATIONS

International Preliminary Report on Patentability corresponding to International Application No. PCT/US2017/044584, dated Feb. 28, 2019.

(Continued)

*Primary Examiner* — Tan Le
(74) *Attorney, Agent, or Firm* — Myers Bigel, P.A.

(57) ABSTRACT

A cable hanger includes: a generally flat base; and first and second opposed arms extending in a first direction from the base; wherein hooks are positioned on free ends of the arms; wherein each of the free ends of the arms has an arcuate cross-section; wherein the arms form a gap configured to receive and grasp a cable; and wherein the cable hanger is a unitary member formed of a polymeric material.

19 Claims, 15 Drawing Sheets

(56) References Cited

U.S. PATENT DOCUMENTS

| | | | |
|---|---|---|---|
| 7,090,174 B2 * | 8/2006 | Korczak | F16B 21/075 |
| | | | 248/58 |
| 7,097,142 B1 | 8/2006 | Schmidt | |
| D632,554 S * | 2/2011 | Grzyb | D8/395 |
| 8,011,621 B2 * | 9/2011 | Korczak | F16L 3/127 |
| | | | 248/231.81 |
| 8,191,838 B2 | 6/2012 | Korczak | |
| 8,439,316 B2 | 5/2013 | Feige | |
| 9,316,029 B2 | 4/2016 | Hunt et al. | |
| 10,253,906 B2 * | 4/2019 | Vaccaro | F16L 3/221 |
| 2002/0066833 A1 * | 6/2002 | Ferrill | F16L 3/04 |
| | | | 248/62 |
| 2003/0089828 A1 | 5/2003 | Korczak et al. | |
| 2006/0249633 A1 | 11/2006 | Korczak et al. | |
| 2009/0230256 A1 | 9/2009 | Widlacki et al. | |
| 2011/0283515 A1 | 11/2011 | Korczak | |

OTHER PUBLICATIONS

Notification of Transmittal of the International Search Report and the Written Opinion of the International Searching Authority, or the Declaration corresponding to International Application No. PCT/US2017/044584, dated Oct. 30, 2017.

* cited by examiner

HANGER FOR MOUNTING CABLES

FIELD OF THE INVENTION

The present application is a continuation of and claims priority to U.S. patent application Ser. No. 15/664,493, filed Jul. 31, 2017, which claims priority from and the benefit of U.S. Provisional Patent Application No. 62/375,213, filed Aug. 15, 2016; U.S. Provisional Patent Application No. 62/444,409, filed Jan. 10, 2017; and U.S. Provisional Patent Application No. 62/483,997, filed Apr. 11, 2017, the disclosure of each of which is hereby incorporated herein by reference in its entirety.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger.

One variety of cable hanger of this type is the SNAP-STAK® hanger, available from CommScope, Inc. (Joliet, Ill.). The SNAP-STAK® hanger is offered in multiple sizes that correspond to the outer diameters of different cables. This arrangement has been suitable for use with coaxial power cables, which tend to be manufactured in only a few different outer diameters. Modified versions of these hangers are discussed in U.S. patent application Ser. No. 15/081,177, filed Mar. 25, 2016 (and hereby incorporated herein by reference); these arrangements may be more desirable for fiber optic cables, which tend to be manufactured in a much greater variety of diameters, and which tend to be much heavier than coaxial cables (sometimes as much as three times heavier per unit foot), which induces greater load and stress on the hangers.

It may be desirable to provide additional cable hanger designs, particularly for different cable sizes.

SUMMARY

As a first aspect, embodiments of the invention are directed to a cable hanger, comprising a generally flat base and first and second opposed arms extending in a first direction from the base. Hooks are positioned on free ends of the arms. Each of the free ends of the arms has an arcuate cross-section. The arms form a gap configured to receive and grasp a cable. The cable hanger is a unitary member formed of a polymeric material.

As a second aspect, embodiments of the invention are directed to a cable hanger, comprising a generally flat base and first and second opposed arms extending in a first direction from the base; wherein hooks are positioned on free ends of the arms. Each of the free ends of the arms has an arcuate cross-section. The base includes two arcuate slots, each of the slots adjacent a fixed end of a respective first or second arm.

As a third aspect, embodiments of the invention are directed to a cable hanger, comprising a generally flat base and first and second opposed arms extending in a first direction from the base, wherein hooks are positioned on free ends of the arms. Stops are located on each of the first and second arms and extend generally perpendicularly to the arms, and a brace extends between the base and each of the stops. The cable hanger is a unitary component formed of a polymeric material.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
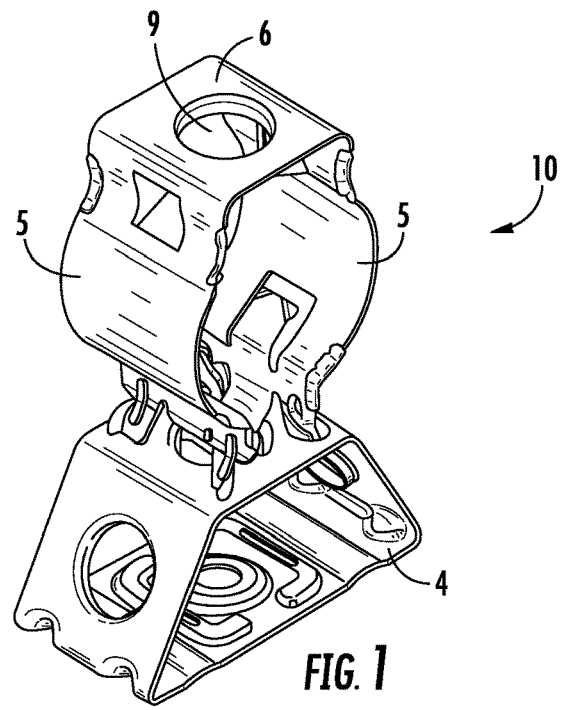
FIG. 1 is a perspective view of a prior art cable hanger.
Figure 2:
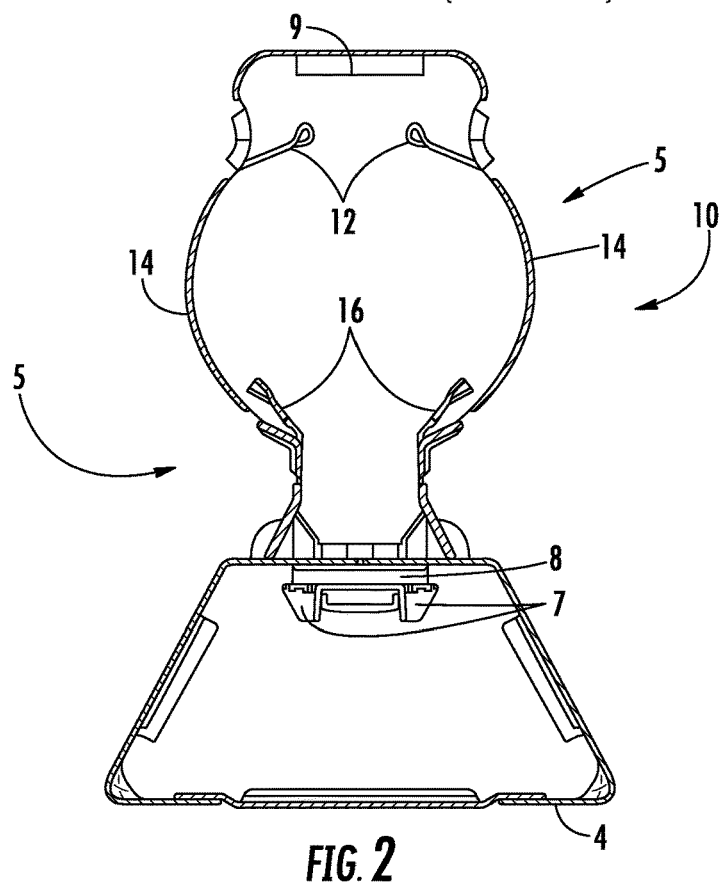
FIG. 2 is a top view of the prior art cable hanger of FIG. 1.

Referring now to the figures, a prior art cable hanger, designated broadly at 10, is shown in FIGS. 1 and 2. The hanger 10 includes curved arms 5 that extend from a flat base 6. Locking projections 7 extend from the free ends of the arms 5. As can be seen in FIGS. 1 and 2, the locking projections 7 are inserted into a reinforced hole 8 in a tower structure 4 to mount the hanger 10 thereon. The base 6 of the hanger 10 includes a reinforced hole 9 that can receive the projections of another hanger 10 to mount a second cable.

As can be best seen in FIG. 2, the arms 5 include arcuate sections 14 that together generally define a circle within which a cable can be grasped. Two cantilevered tabs 12 extend radially inwardly and toward the base 6 at one end of the arcuate sections 14, and two cantilevered tabs 16 extend radially inwardly and toward the base 6 from the opposite ends of the arcuate sections 14. The cantilevered tabs 12, 16 are deployed to deflect radially outwardly when the hanger 10 receives a cable for mounting; this deflection generates a radially inward force from each tab 12, 16 that grips the jacket of the cable.

Figure 3:
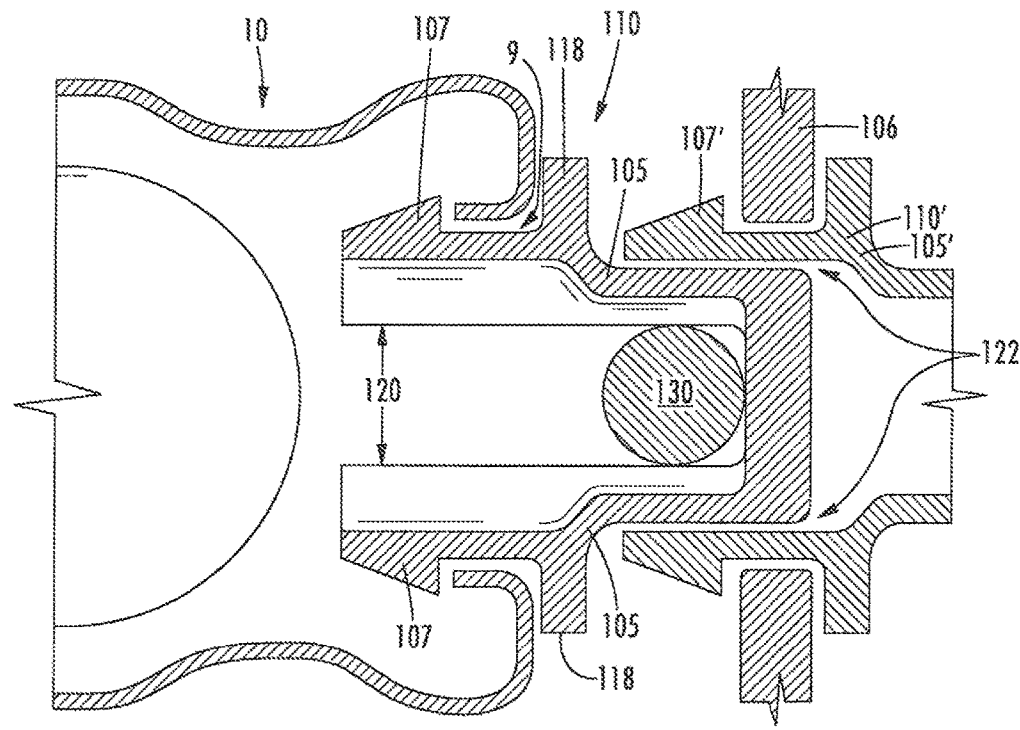
FIG. 3 is a top view of a cable hanger according to embodiments of the invention mounted onto a prior art cable as in FIG. 1.
Figure 4:
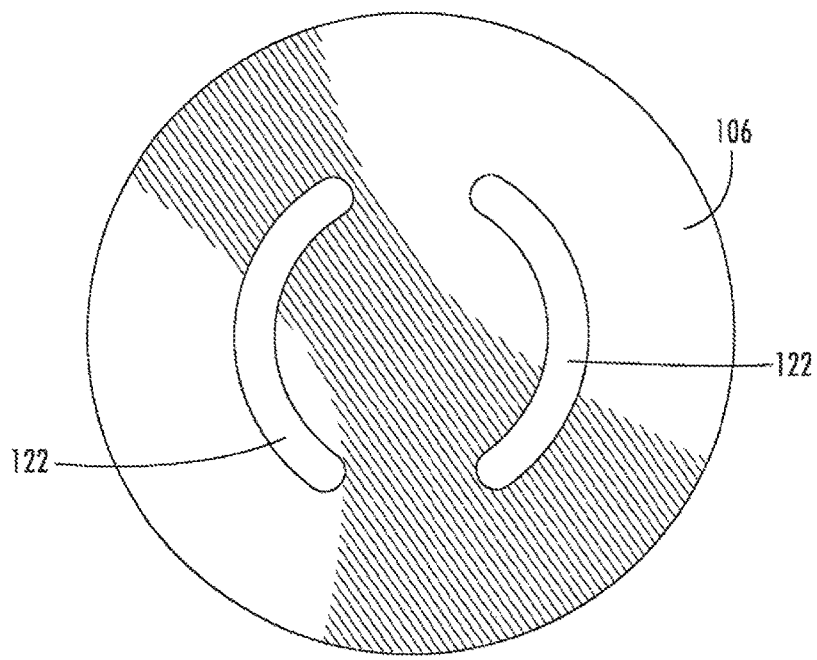
FIG. 4 is an end view of the cable hanger of FIG. 3.

The hanger 10 is popular for the mounting of larger coaxial cables, that tend to be provided in relatively few different sizes, but may be less popular for smaller cables. FIGS. 3 and 4 are illustrate a cable hanger, designated broadly at 110, that may be employed with hangers 10 or by themselves to mount smaller cables. As illustrated, the cable hanger 110 includes a base 106 with two opposed arms 105 extending from the base 106. Each of the arms 105 is arcuate in profile (best seen as arms 205 with respect to cable hanger 210 in FIG. 6). A hook 107 is located at the free end of each arm 105. Each arm 105 also has a radially-outwardly-extending stop 118. A gap 120 is present between the arms 105. Arcuate slots 122 are present in the base adjacent and radially outwardly of the fixed ends of the arms 105.

As can be seen in FIG. 3, the cable hanger 110 can be used to mount a cable to a cable hanger 10. A cable 130 is positioned in the gap 120 between the arms 105. The cable hanger 110 is then mounted in the hole 9 of the cable hanger 10 by aligning the arms 105 with the hole 9 and pushing the base 106 toward the cable hanger 10 (not unlike the motion used to insert a thumbtack). This motion deflects the free ends of the arms 105 toward each other to enable the hooks 107 to fit within the hole 9. The cable hanger 110 is pushed in the direction of the cable hanger 10 until the hooks 107 clear the edges of the hole 9, at which point the arms 105 deflect away from each other to secure the cable hanger 110 to the cable hanger 10. The inner edges of the arms 105 grip the cable 130.

As shown in FIG. 3, a second cable hanger 110' can be employed to mount a cable to the cable hanger 110. The hooks 107' of the arms 105' of the second cable hanger 110' are inserted into the slots 122 in the base 106 of the first cable hanger 110. Additional cable hangers can then be "stacked" onto the second cable hanger 110'.

It should also be apparent to those of skill in this art that the cable hanger 110 can be used to mount a cable directly to a mounting structure such as the tower 4 without an intervening cable hanger 10.

Figure 5:
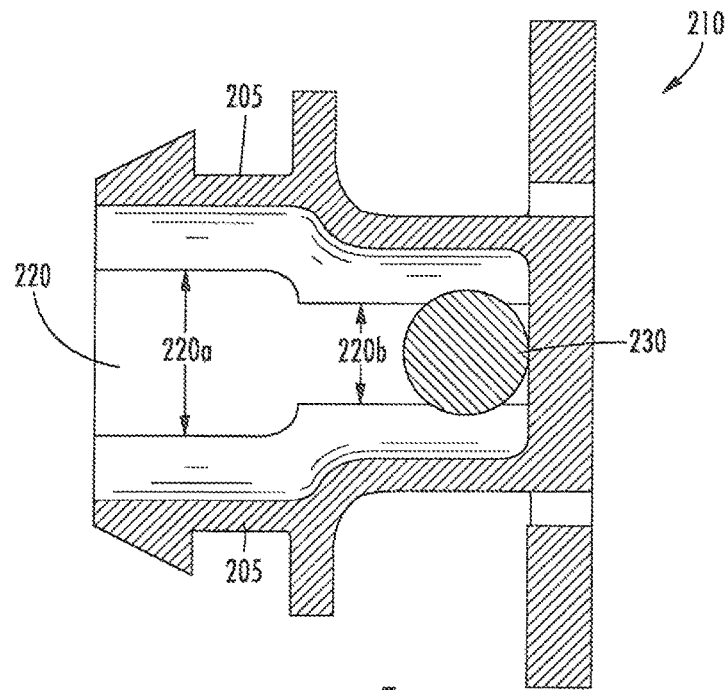
FIG. 5 is a top view of a cable hanger according to alternative embodiments of the invention.
Figure 6:
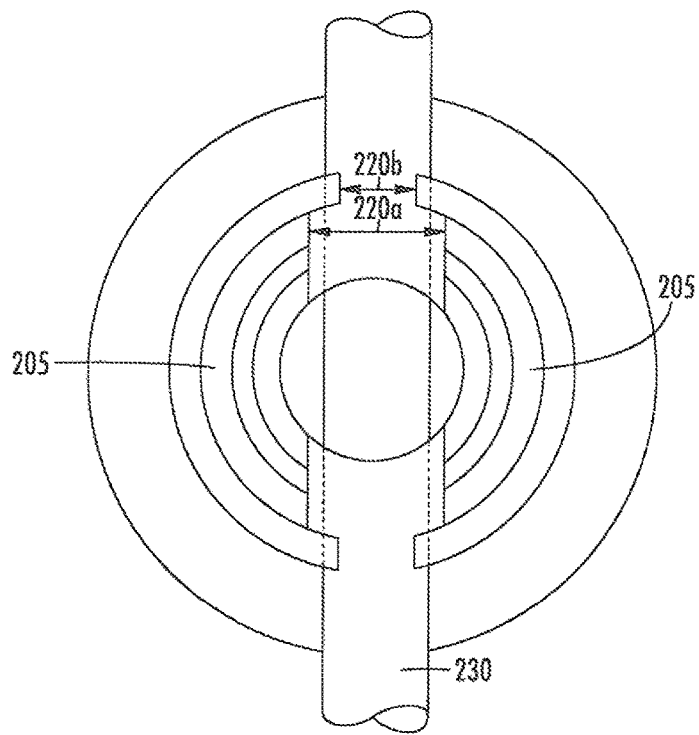
FIG. 6 is an end view of the cable hanger of FIG. 5 holding a cable.

Other embodiments or cable hangers may include structures to enhance insertion and grasping of a cable. Referring to FIGS. 5 and 6, a cable hanger 210 is similar to the cable hanger 110 with the exception that the gap 220 between the arms 205 is wider near the free ends of the arms 205 than at their fixed ends. As a result, a cable 230 can be inserted easily into the wider end 220a of the gap 220, but is grasped more firmly at the narrow end 220b of the gap 220.

Figure 7:
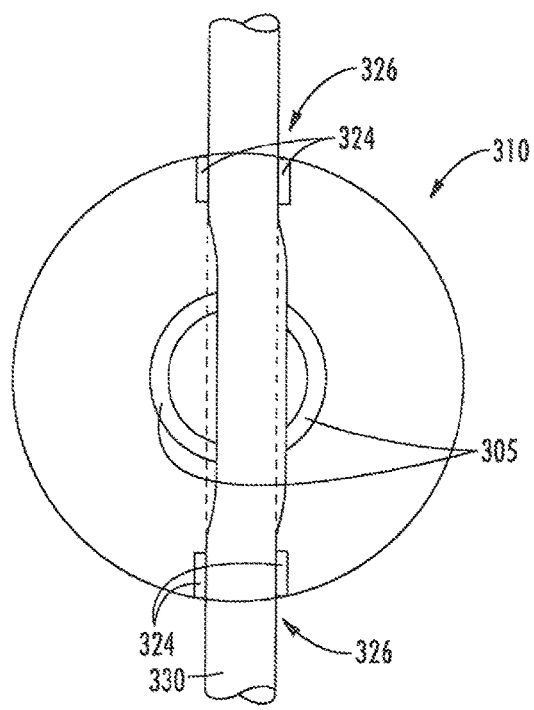
FIG. 7 is an end view of a cable hanger according to additional embodiments of the invention, wherein the cable hanger is holding a cable.
Figure 8:
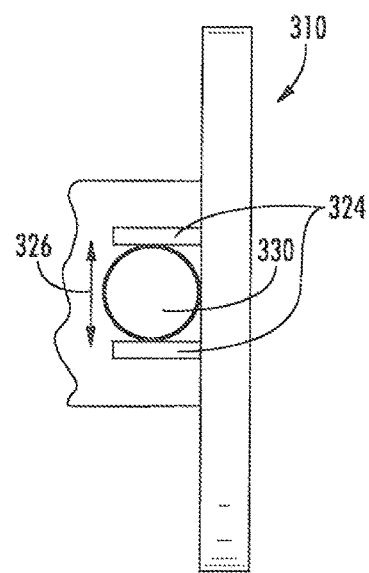
FIG. 8 is a partial top view of the cable hanger of FIG. 7.

Referring now to FIGS. 7 and 8, another embodiment of a cable hanger, designated broadly at 310, is shown therein. The cable hanger 310 is similar to the cable hanger 110 with the exception that two ridges or tabs 324 extend away from the base 306 on opposite sides thereof. The gaps 326 between the ridges 324 are offset slightly from the gap 320 formed by the arms 305. As a result, the cable 330 inserted into the gaps 320, 326 takes a slight diversion from a straight path, which improves the overall grip of the cable 330 by the cable hanger 310. As few as one ridge 324 may be sufficient to bend the cable 330 sufficiently to improve the grip.

Figure 9:
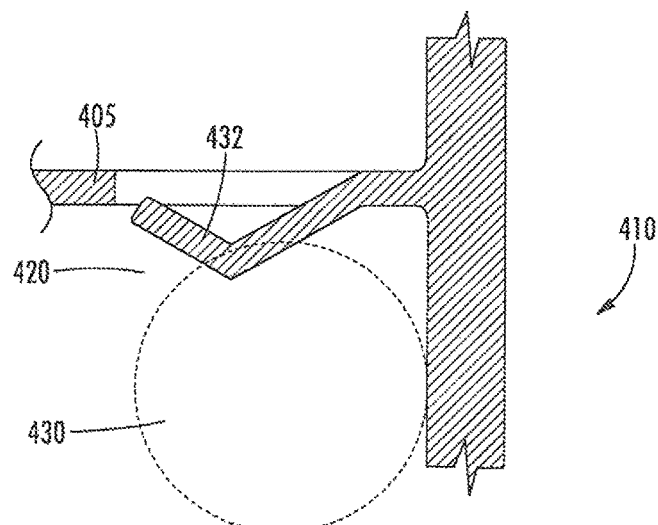
FIG. 9 is a partial top view of a cable hanger according to embodiments of the invention.
Figure 10:
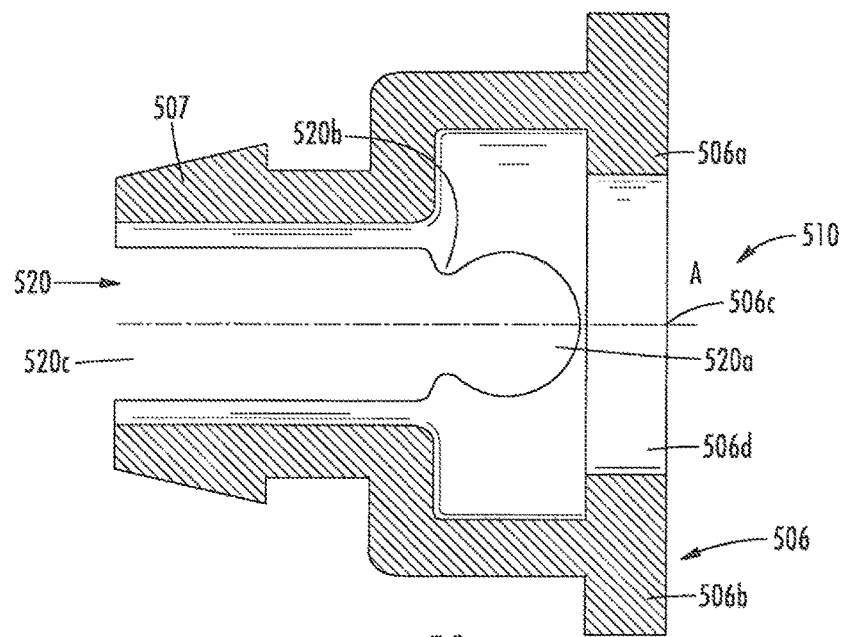
FIG. 10 is a top view of a cable hanger according to additional embodiments of the invention.
Figure 11:
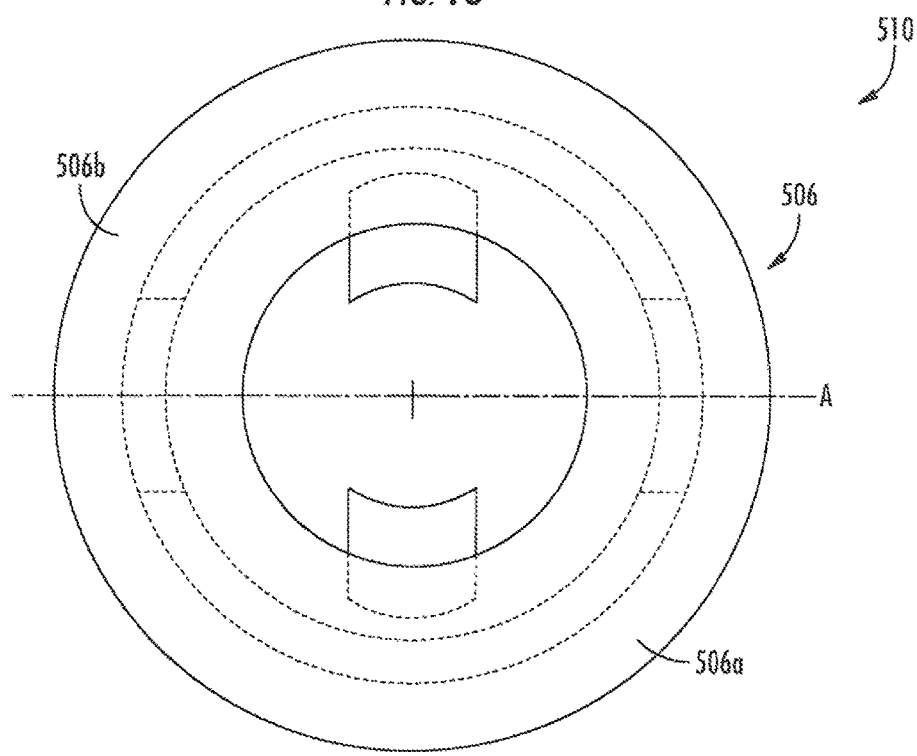
FIG. 11 is an end view of the cable hanger of FIG. 10.
Figure 12:
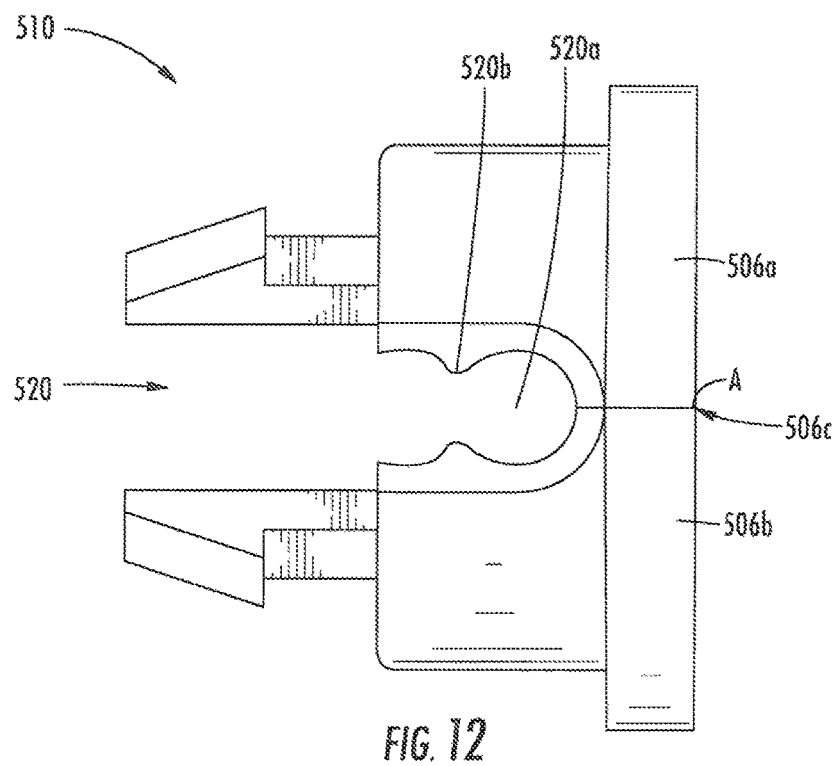
FIG. 12 is a top section view of the cable hanger of FIG. 10.
Figure 13:
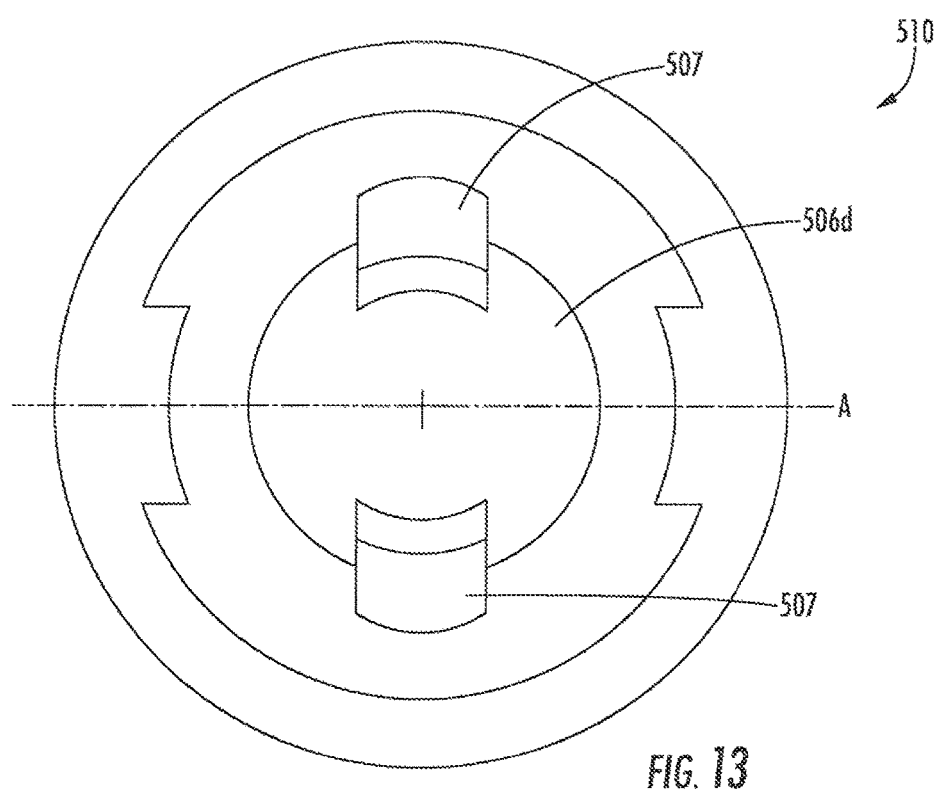
FIG. 13 is an opposite end view of the cable hanger of FIG. 10.

Referring now to FIG. 9, a portion of another embodiment of a cable hanger, designated broadly at 410, is shown therein. The cable hanger 410 is similar to the cable hanger 110 with the exception that the arms 405 include bent cantilevered tabs 432 that extend into the gap 420. The tabs 432 can deflect relative to and toward the arms 405, which can enable the cable hanger 410 to accommodate a wider variety of cable thicknesses.

Those skilled in this art will appreciate that cable hangers according to embodiments of the invention may combine the above-mentioned features to improve cable grip. For example, a cable hanger may have both ridges as in cable hanger 310 and cantilevered tabs as in cable hanger 410.

Those skilled in this art will appreciate that the cable hangers 110, 210, 310, 410 discussed above are typically formed of a polymeric material, such as acetal resin, and may be formed as a unitary member (often via injection molding). The cable hangers may also be configured to grasp different sizes of cables: for example, one size of hanger may be employed to mount cables having an outer jacket with a 4-7 mm diameter (DOJ), another size of hanger may mount 7-10 mm DOJ cables, and a third size of hanger may mount 10-14 mm DOJ cables.

Referring now to FIGS. 10-13, another cable hanger, designated broadly at 510, is shown therein. The cable hanger 510 shares similarities with the cable hangers 110, 210, but has some exceptions. First, the gap 520 is divided by projections 520b into a closed-end pocket 520a and an open-ended channel 520c. Second, the base 506 is divided into two halves 506a, 506b that are attached via a living hinge 506c that has a pivot axis A. Third, rather than slots similar to slots 122 of the cable hanger 110, the base 506 has a central hole 506d configured to receive the locking projections 507 of a second cable hanger.

Figure 14:
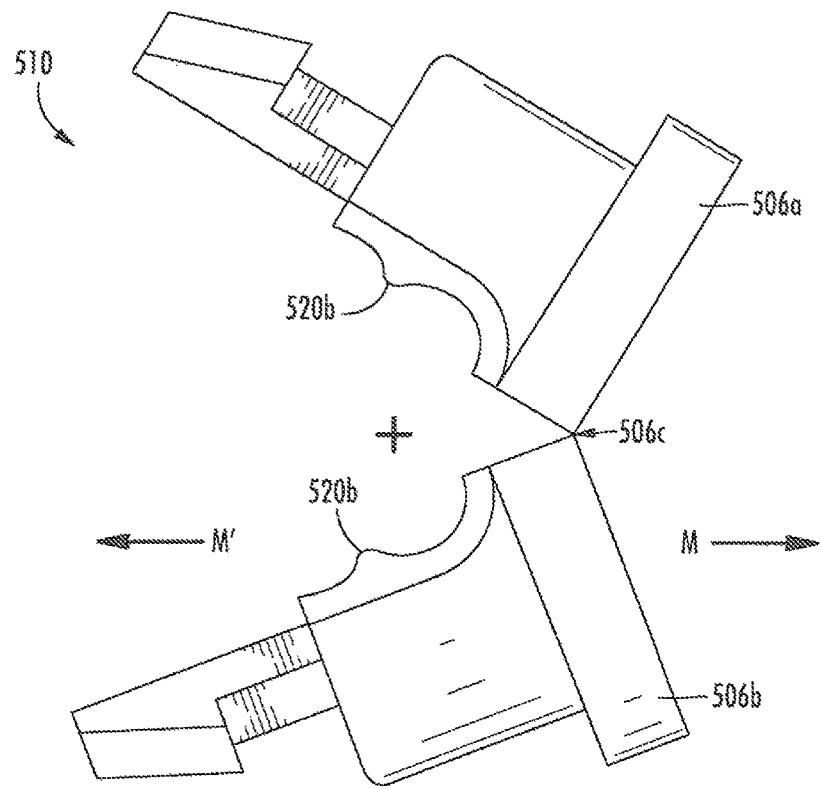
FIG. 14 is a top view of the cable hanger of FIG. 10 shown in an open hinged position.

As can be seen in FIG. 14, the halves 506a, 506b of the base 506 of the cable hanger 510 can pivot about the pivot axis A defined by the living hinge 506c. The presence of the living hinge 506c enables the cable hanger 510 to include the projections 520b in the gap 520 and be injected molded in a relatively straightforward manner; the reciprocating halves of the mold can be drawn in the directions M, M' shown in FIG. 14 and form the cable hanger 510 without the need for any "side-action" slides or the like in the mold.

Figures 15A, 15B, 15C:
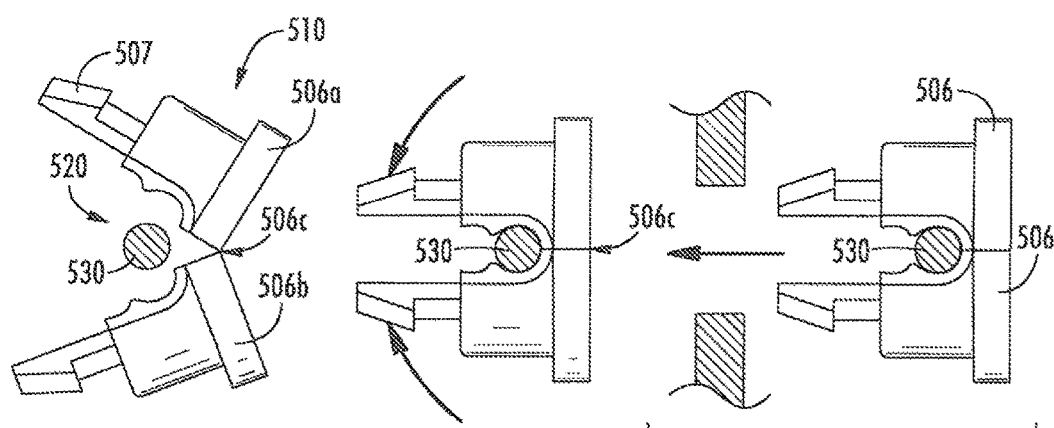
FIGS. 15A-15C are top views showing the clamping and mounting of a cable with the cable hanger of FIG. 10.

Referring now to FIGS. 15A-15C, use of the cable hanger 510 is shown therein. The cable hanger 510 can be "opened" so that the locking projections 507 are separated. A cable 530 can be inserted into the gap 520. The halves 560a, 506b of the cable hanger 510 can be pivoted about the axis A to close the halves 506a, 506b and capture the cable 530 in the pocket 520a. The cable hanger 510 and cable 530 can then be mounted onto a mounting structure, cable hanger or adapter as discussed above.

The cable hanger 510 may be suitable for the mounting of a cable of any size. In some embodiments, the cable hanger 510 may be sized to mount cables having a diameter of between about 7 and 10 mm.

Figure 16:
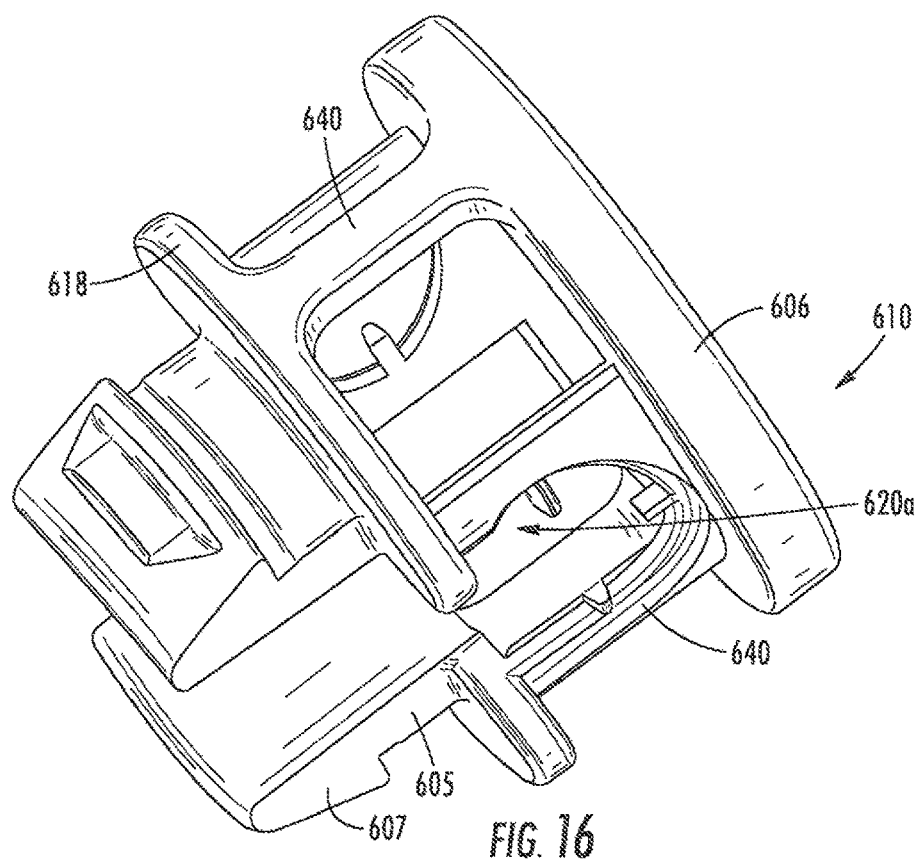
FIG. 16 is a perspective view of a cable hanger according to additional embodiments of the invention.
Figure 17:
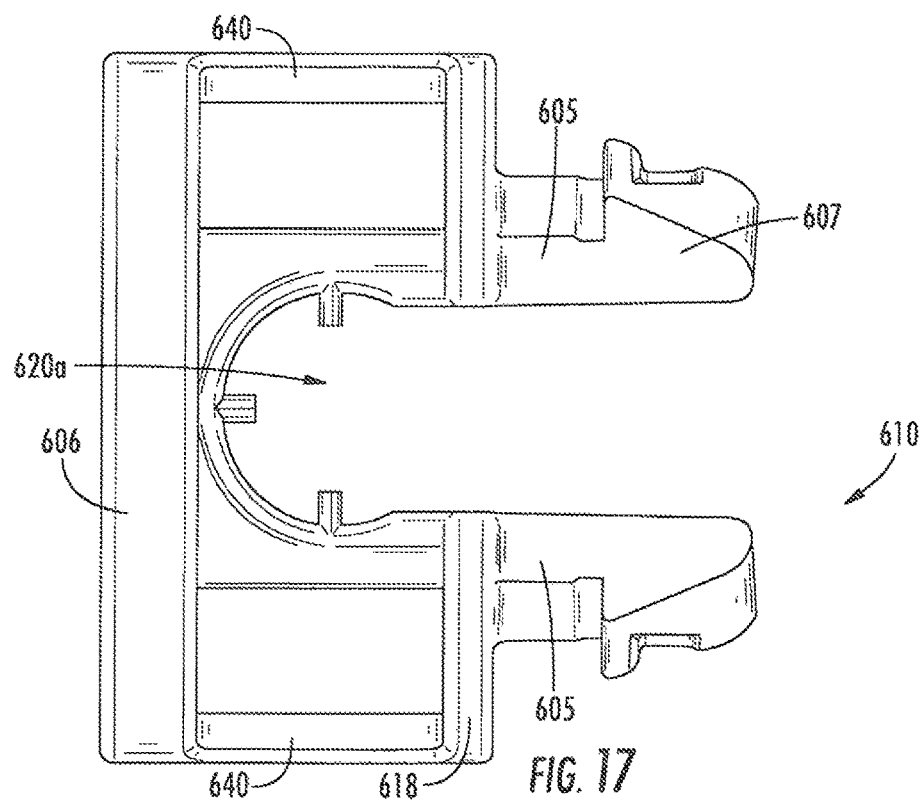
FIG. 17 is a side view of the cable hanger of FIG. 16.
Figure 18:
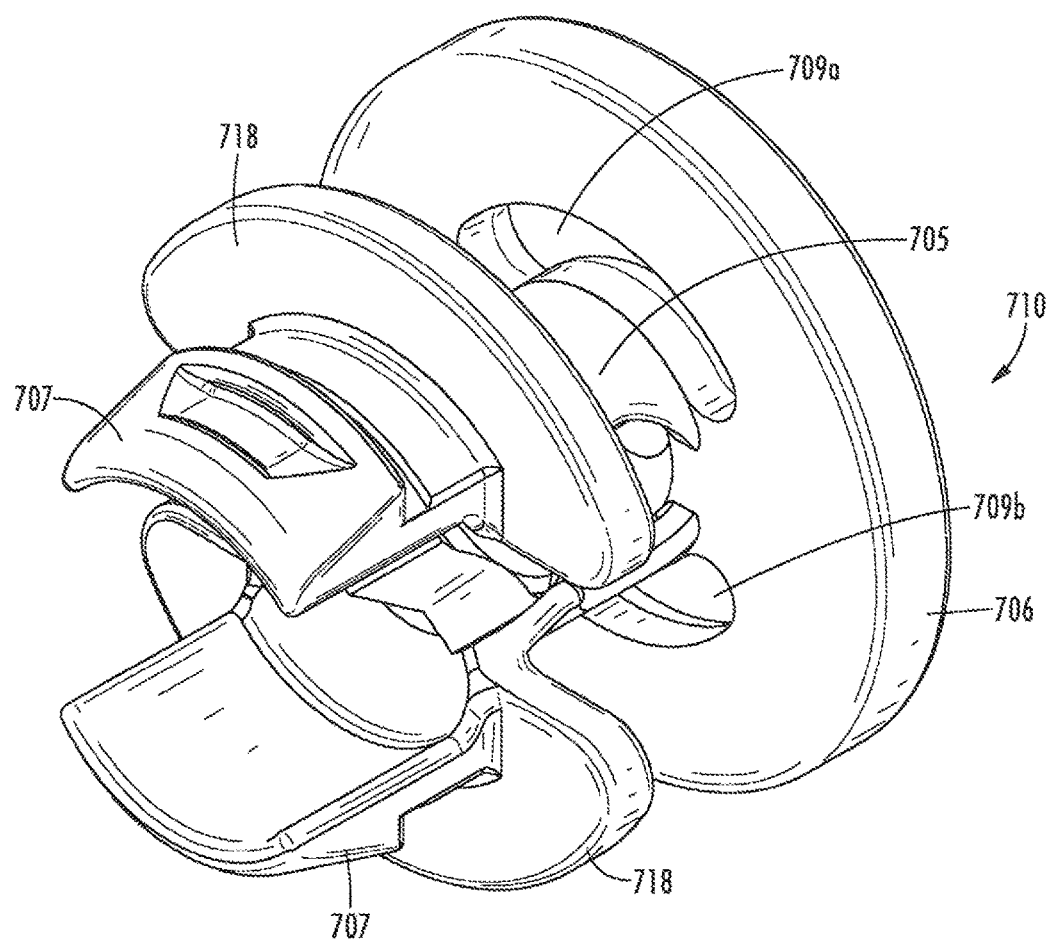
FIG. 18 is a perspective view of a cable hanger according to further embodiments of the invention.
Figure 19:
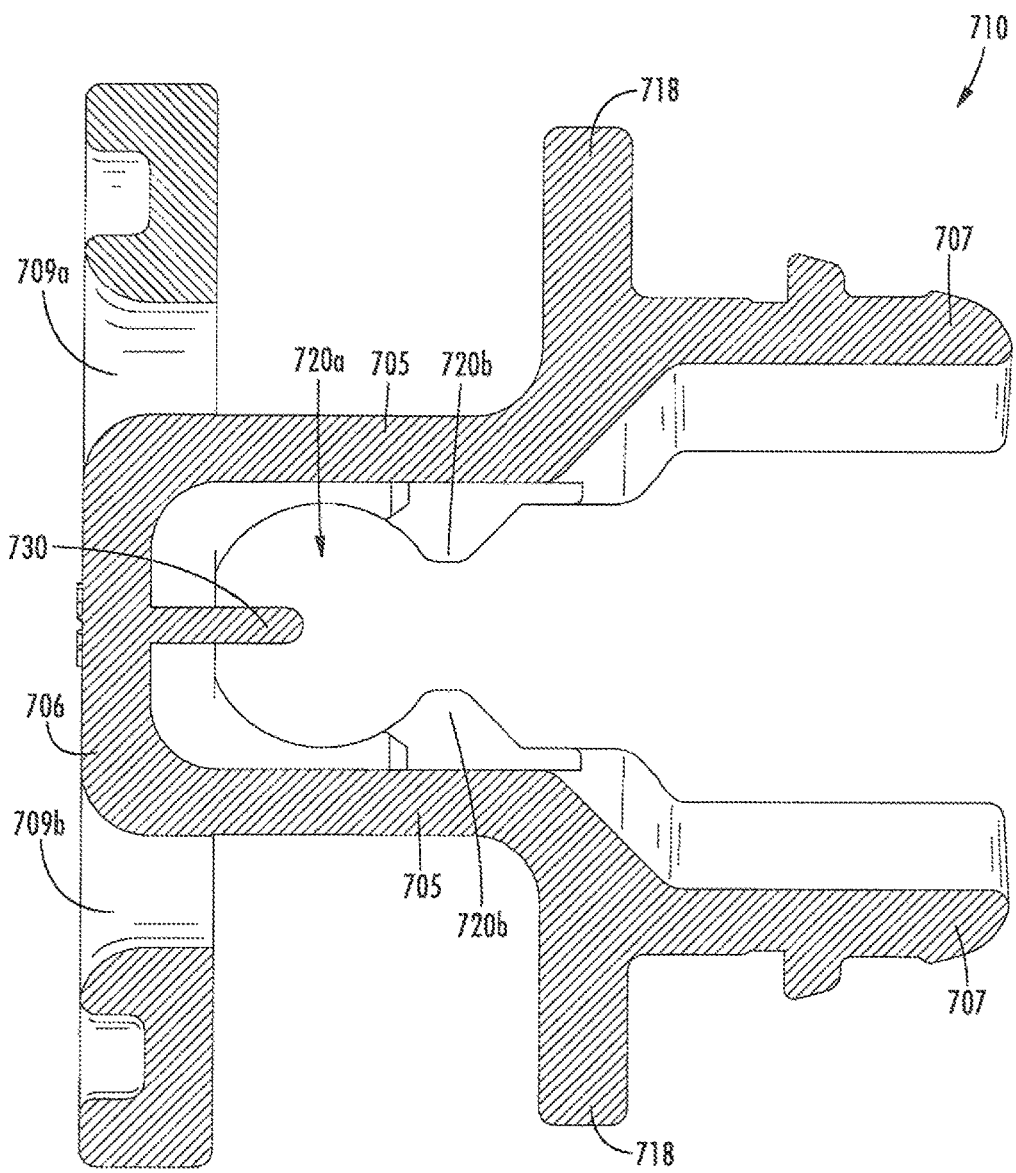
FIG. 19 is a side section view of the cable hanger of FIG. 19.
Figure 20:
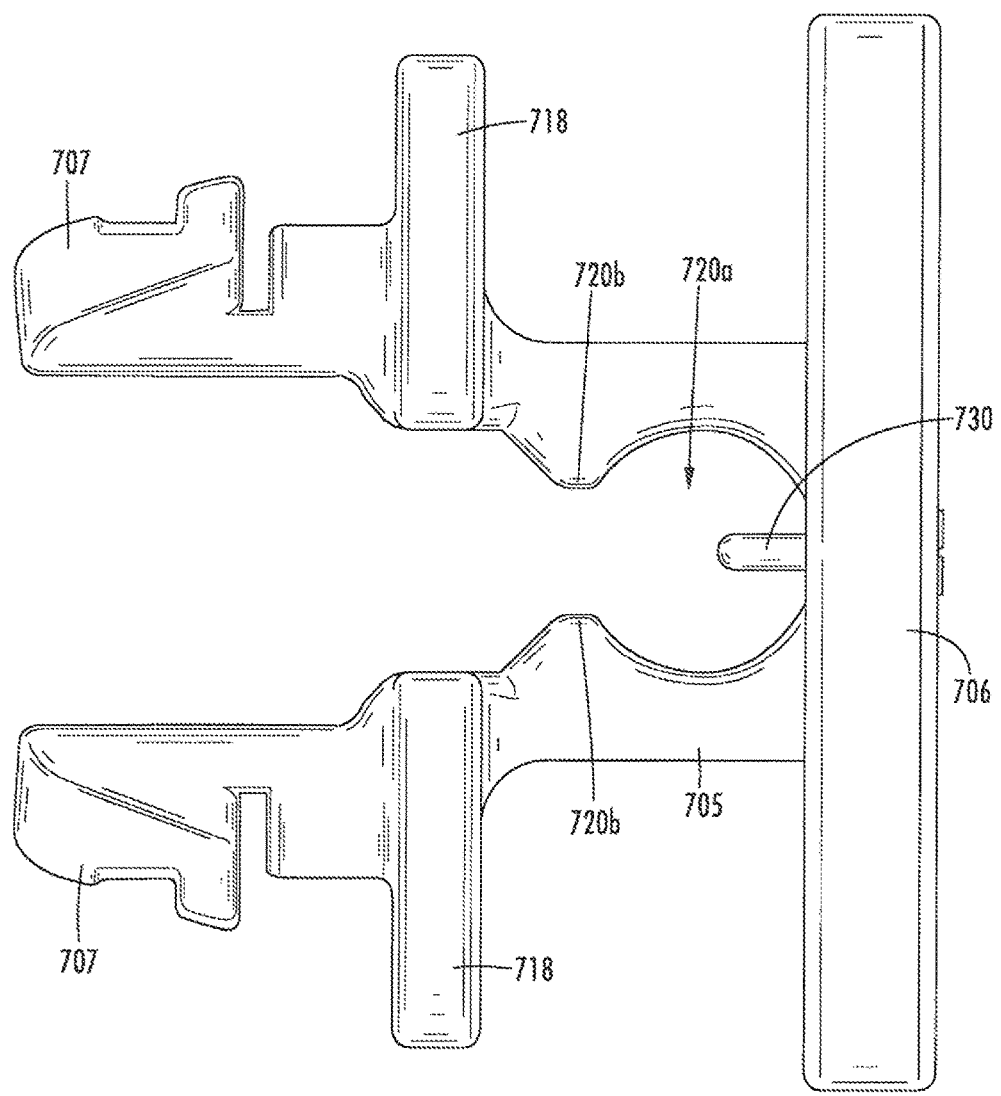
FIG. 20 is a side view of the cable hanger of FIG. 19.
Figure 21:
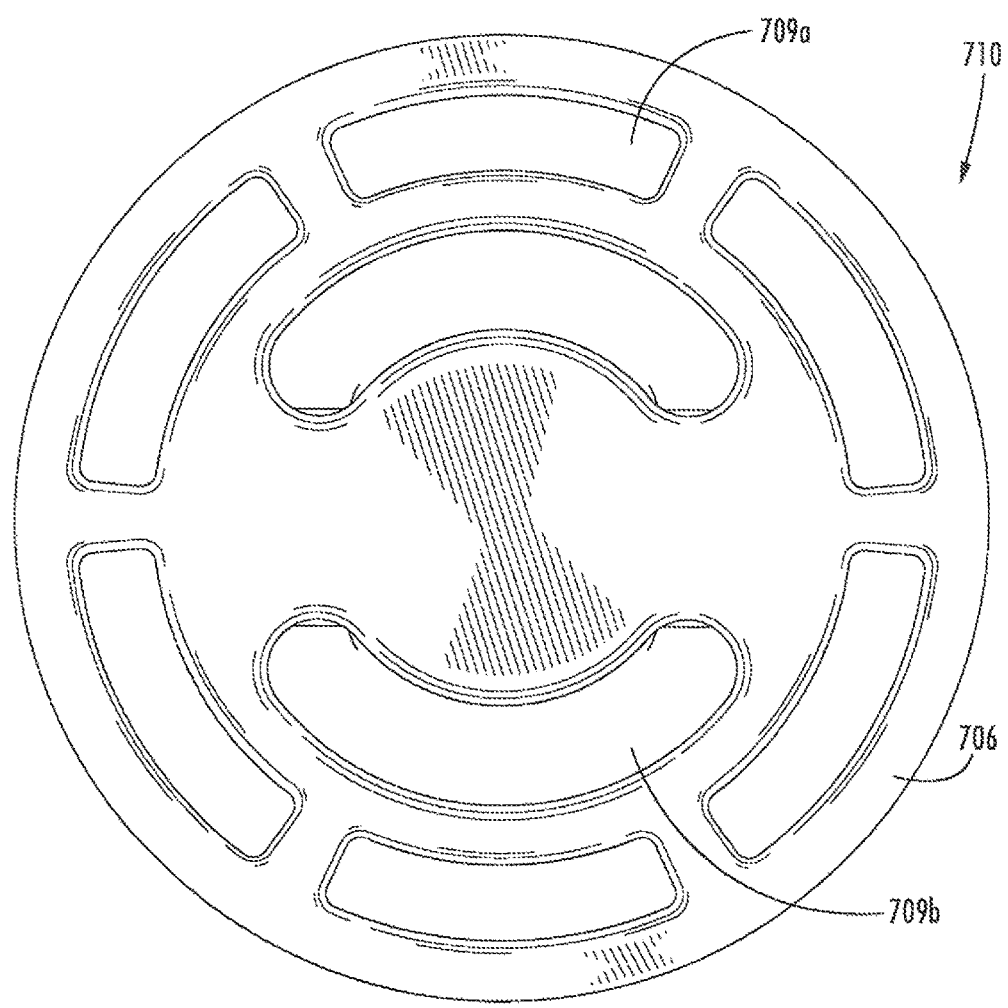
FIG. 21 is a front view of the cable hanger of FIG. 19.

Referring now to FIGS. 16 and 17, another cable hanger according to embodiments of the invention, designated broadly at 610, is shown therein. The cable hanger 610 is similar to the cable hanger 110 described above in that it includes a base 606 and arms 605 with hooks 607 and stops 618. The cable hanger 610 also includes a pocket 620a to hold a cable similar to the pocket 520a of cable hanger 510. However, the cable hanger 610 also includes braces 640 that extend between the base 606 and the stops 618 on the arms 605. The braces 640 can provide strength and rigidity to the cable hanger 610 to enable it to remain in position once it has been mounted to capture a cable. In addition, the braces 640 can help the cable hanger 610 to maintain its shape in the event that the cable hanger 610 is formed of a polymeric material (for example, via injection molding). Polymeric components tend to shrink as they cool after molding, which in some instances can cause the component to deform undesirably from its molded shape. The braces 640 can assist in preventing deformation due to shrinkage of the cable hanger 610 as it cools after molding.

Referring now to FIGS. 18-21, another cable hanger according to embodiments of the invention, designated broadly at 710, is shown therein. The cable hanger 710 is similar to the cable hanger 610 in that it that it includes a base 706 and arms 705 with hooks 707 and stops 718. The cable hanger 710 also includes a pocket 720a to hold a cable similar to the pocket 620a of cable hanger 610. The base 706 includes two arcuate holes 709a, 709b that are configured to receive the hooks 707 of a second cable hanger 710.

The cable hanger 710 also includes a small post 730 that extends from the closed end of the pocket 720a generally parallel to the arms 705. The post 730 serves to improve the grip of the cable hanger 710 on cables that have a diameter smaller than that of the pocket 720a. For such cables, the post 730 pokes into the jacket of the cable, thereby pushing it into the projections 720b that narrow the open end of the pocket 720a. The post 730 is typically sufficiently slender that, in the event a cable having a diameter slightly less than or equal to the pocket 720a, the post either fractures or bends out of the way.

Figure 22:
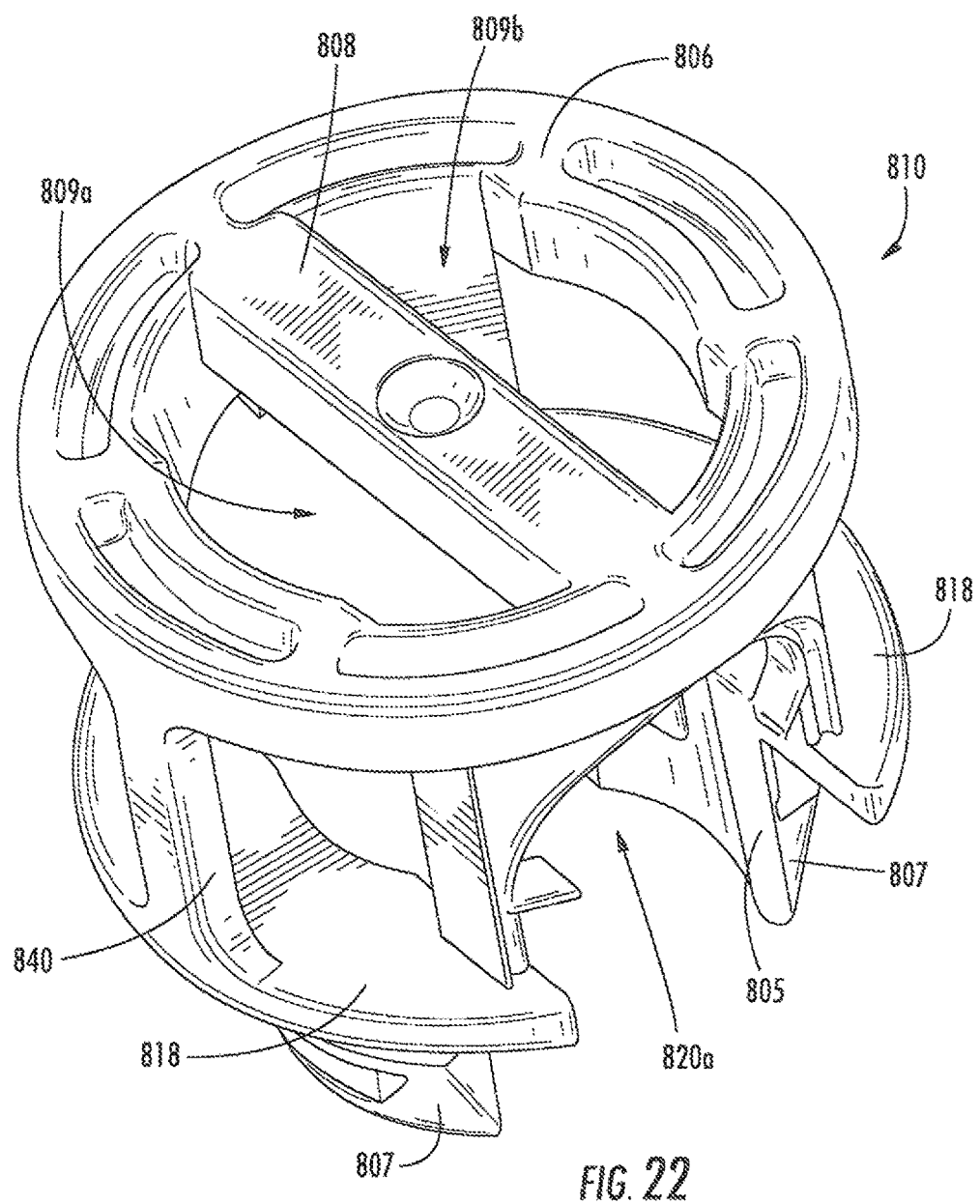
FIG. 22 is a perspective view of a cable hanger according to further embodiments of the invention.
Figure 23:
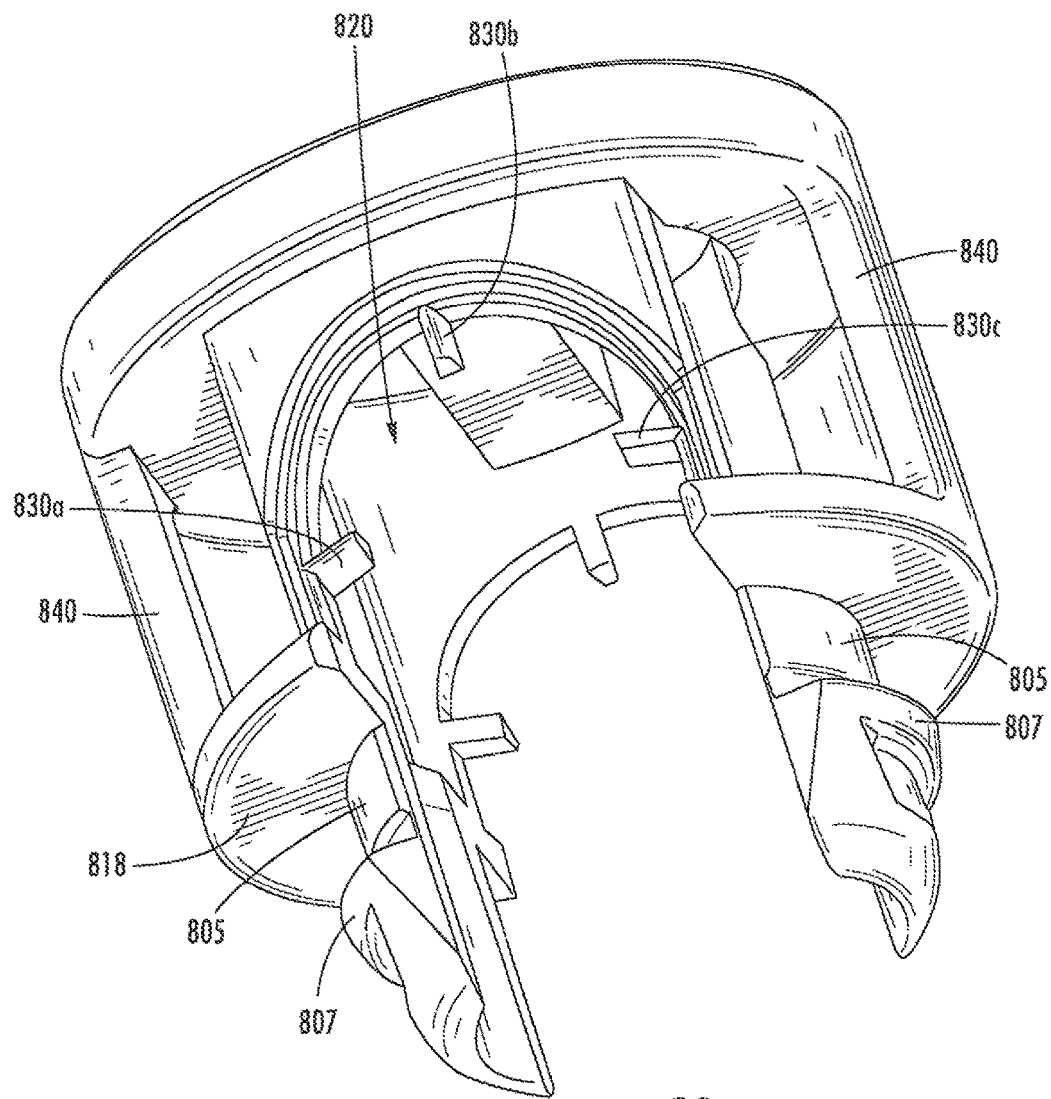
FIG. 23 is an opposite perspective view of the cable hanger of FIG. 22.
Figure 24:
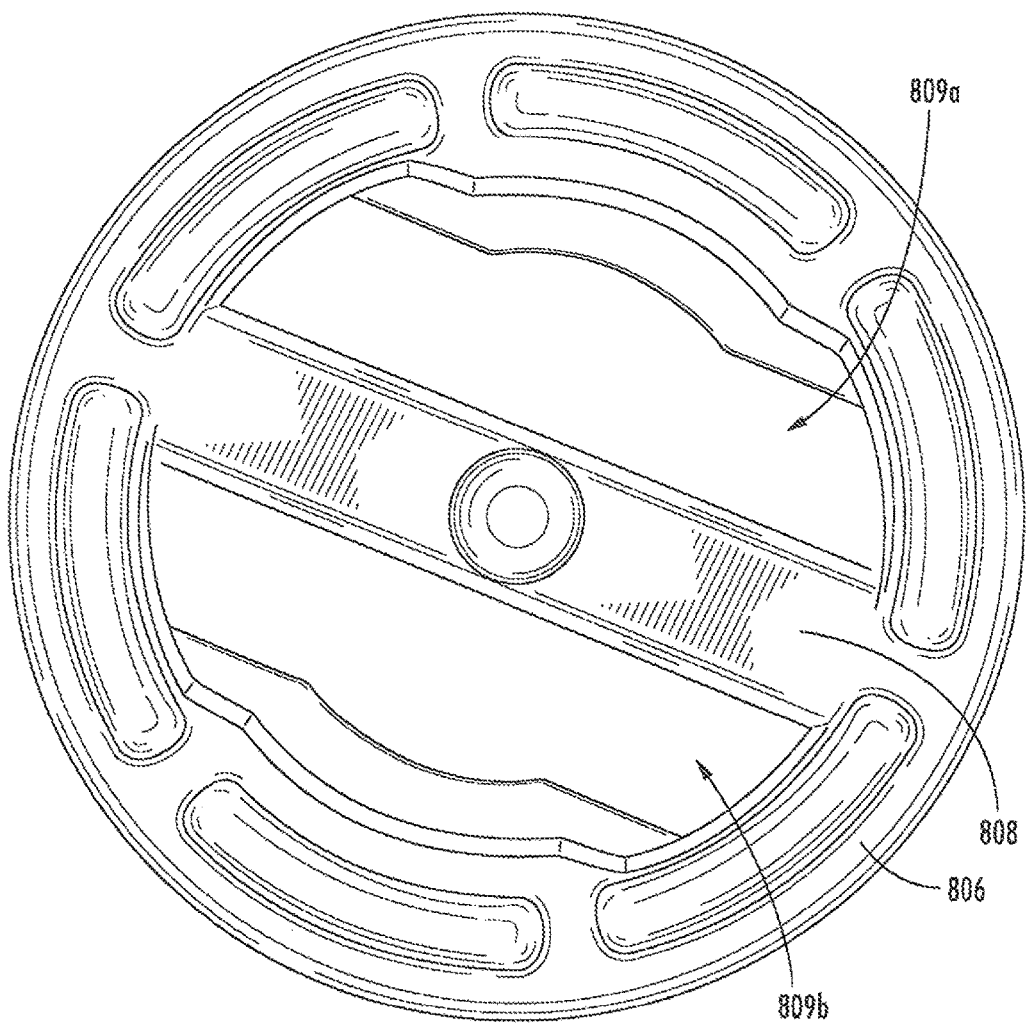
FIG. 24 is a side view of the cable hanger of FIG. 22.

Referring now to FIGS. 22-24, another cable hanger according to embodiments of the invention, designated broadly at 810, is shown therein. The cable hanger 810 is similar to the cable hanger 610 described above in that it includes a base 806 and arms 805 with hooks 807 and stops 818. The cable hanger 810 also includes a pocket 820a to hold a cable similar to the pocket 620a of cable hanger 610. The cable hanger 810 also includes braces 840 that extend between the base 806 and the stops 818 on the arms 805. The braces 840 are positioned radially outwardly sufficiently to enable the hooks 807 of a second cable hanger 810 to comfortably engage the underside of the base 806. Also, the cable hanger 810 includes a cross-beam 808 that extends across the base 806 to form two holes 809a, 809b in the base 806. These holes 809a, 809b receive the hooks 807 of a second cable hanger 810.

The cable hanger 810 also includes three posts 830a, 830b, 830c similar to the post 730 of the cable hanger 710. The posts 830a, 830c are located on opposite sides of the pocket 820a and extend generally toward each other, and the post 830b extends generally parallel to the arms 805 similar to the post 730 of the cable hanger 710.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable hanger, comprising:
    a generally flat base; and
    first and second opposed arms extending in a first direction from the base: wherein hooks are positioned on free ends of the arms;
    wherein the arms form a gap configured to receive and grasp a cable;
    wherein each of the free ends of the arms has an arcuate cross-section taken normal to a longitudinal axis of the arm; and
    wherein the base includes two openings, each of the openings including an arcuate edge, each of the openings adjacent a fixed end of a respective first or second arm.

2. The cable hanger defined in claim 1, wherein the gap is wider adjacent the free ends of the arms than at fixed ends of the arms.

3. The cable hanger defined in claim 1, wherein the first and second arms and hooks are configured to be inserted into a nominal ¾ inch hole.

4. The cable hanger defined in claim 1, in combination with a cable grasped by the first and second arms.

5. The cable hanger defined in claim 1 in combination with a second cable hanger as defined in claim 1, wherein the hooks of the second cable hanger are inserted into the openings of the first cable hanger.

6. The cable hanger defined in claim 5 in combination with a second cable hanger having a nominal ¾ inch hole, with the hooks inserted into the hole of the second cable hanger.

7. The cable hanger defined in claim 1, further comprising stops on each of the first and second arms.

8. The cable hanger defined in claim 7, wherein a brace extends between the base and each of the stops.

9. The cable hanger defined in claim 1, wherein at least one post extends into the gap.

10. A cable hanger, comprising:
a generally flat base; and
first and second opposed arms extending in a first direction from the base; wherein hooks are positioned on free ends of the arms;
wherein the arms form a gap configured to receive and grasp a cable;
wherein the base includes two openings, each of the openings adjacent a fixed end of a first or second arm; and
further comprising stops on each of the first and second arms, wherein a brace extends between the base and each of the stops.

11. The cable hanger defined in claim 10, wherein the gap is wider adjacent the free ends of the arms than at fixed ends of the arms.

12. The cable hanger defined in claim 10, wherein the first and second arms and hooks are configured to be inserted into a nominal ¾ inch hole.

13. The cable hanger defined in claim 10, in combination with a cable grasped by the first and second arms.

14. The cable hanger defined in claim 9 in combination with a second cable hanger as defined in claim 9, wherein the hooks of the second cable hanger are inserted into the openings of the first cable hanger.

15. The cable hanger defined in claim 14 in combination with a second cable hanger having a nominal ¾ inch hole, with the hooks inserted into the hole of the second cable hanger.

16. The cable hanger defined in claim 10, wherein at least one post extends into the gap.

17. A cable hanger, comprising:
a generally flat base; and
first and second opposed arms extending in a first direction from the base; wherein hooks are positioned on free ends of the arms;
wherein the arms form a gap configured to receive and grasp a cable;
wherein the base includes two openings, each of the openings adjacent a fixed end of a first or second arm; and
further comprising three posts that extends into the gap, wherein a first post extends in generally the same direction as the arms and the remaining two posts extend from opposite sides of the gap in directions substantially perpendicular to that of the first post.

18. The cable hanger defined in claim 17, wherein the first and second arms and hooks are configured to be inserted into a nominal ¾ inch hole.

19. The cable hanger defined in claim 17, in combination with a cable grasped by the first and second arms.

* * * * *

UNITED STATES PATENT AND TRADEMARK OFFICE
CERTIFICATE OF CORRECTION

PATENT NO. : 10,508,757 B2
APPLICATION NO. : 16/280503
DATED : December 17, 2019
INVENTOR(S) : Robert A. Vaccaro Page 1 of 1

It is certified that error appears in the above-identified patent and that said Letters Patent is hereby corrected as shown below:

In the Claims

Column 6, Line 49, Claim 1: Please correct "base:" to read -- base; --

Column 8, Line 23, Claim 17: Please correct "extends" to read -- extend --

Signed and Sealed this
Third Day of March, 2020

Andrei Iancu
*Director of the United States Patent and Trademark Office*